United States Patent [19]
Kurasawa

[11] 3,719,335
[45] March 6, 1973

[54] AUTOMATIC FILM REWINDING DEVICE FOR SMALL MOVIE PROJECTORS

[75] Inventor: Makoto Kurasawa, Tokyo, Japan

[73] Assignee: Kabushiki Kaisha Ricoli, Nakamagone, Ota-ku, Tokyo, Japan

[22] Filed: Dec. 1, 1970

[21] Appl. No.: 94,050

[30] Foreign Application Priority Data

Dec. 8, 1970 Japan..............................45/98785

[52] U.S. Cl. ................242/186, 242/205, 352/124
[51] Int. Cl..........................B65h 63/04, B65h 25/00
[58] Field of Search......242/205, 186, 189, 190, 201, 242/202, 204, 208, 207, 209, 206, 210; 352/124, 72

[56] References Cited

UNITED STATES PATENTS

| | | | |
|---|---|---|---|
| 3,240,550 | 3/1966 | Mitchell et al. | 242/189 X |
| 3,326,482 | 6/1967 | Michaels et al. | 242/189 |
| 3,552,683 | 1/1971 | Bundschuh et al. | 242/205 |

Primary Examiner—George F. Mautz
Attorney—McGlew and Toren

[57] ABSTRACT

An automatic film rewinding device for small movie projectors effects automatic rewinding of the film responsive to detection of tensioning of the film, wound on a supply reel, at the terminating stage of film supply, and is operable selectively to effect single-frame projection as well as projection of the film while the latter is moving in the rewinding direction. An externally accessible operating knob is operable to move a control cam group between forward film feed, neutral and reverse film feed positions, and a control lever group includes certain levers engaged with the control cam group and other levers operated by the cam engaging levers. The control lever group sets the components of the projector either to feed film forwardly or to rewind film and is locked in the forward feed film position and in the neutral position by a locking lever which is directly released by a member subjected to tension of the film. The control lever group includes only three cams.

8 Claims, 11 Drawing Figures

INVENTOR.
MAKOTO KURASAWA

AUTOMATIC FILM REWINDING DEVICE FOR SMALL MOVIE PROJECTORS

CROSS REFERENCE TO RELATED APPLICATION

The present invention is an improvement upon the automatic film rewind device shown and described in commonly assigned application Ser. No. 73,814, filed Sept. 21, 1970, by Tatsusuke Kadowaki for "Automatic Film Rewind Device for Movie Projectors of the Same Type."

BACKGROUND OF THE INVENTION

In a small movie projector, such as an 8 mm. projector, using a film cartridge, difficulty is experienced in attaching the film to the film supply reel spindle in the film cartridge when the film was to be rewound after having been projected. This is particularly true if all the film is paid out from the supply reel and wound on the take-up reel projection, with the trailing end of the film being detached from the supply reel spindle. To obviate this problem, the trailing end of the film contained in the cartridge is firmly secured to the film supply reel spindle in the cartridge, as by an adhesive tape, and thus is prevented from being detached from the supply reel spindle.

One problem still remaining with the use of a film cartridge in which the trailing end of the film is firmly secured to the film supply reel spindle is that, if the film is advanced, during projection, without paying any attention to the reduction in the amount of film remaining on the supply reel spindle, that portion of the film between the trailing end, firmly secured to the supply reel spindle, and the portion being paid out, is tensioned as the film nears its trailing end portion, thereby damaging or breaking the film. This problem can be obviated if the advance of the film is stopped or if rewinding of the film is started, before the tensioning occurs after projection of the film has been completed. However, if it is attempted to stop the advance of the film manually before tensioning occurs, it is very difficult to select the opportune time and the operator is liable to fail in attaining his objective. It is thus desirable to provide some means for stopping automatically the advance movement of the film, or starting automatically the rewinding of the film, before all of the film is paid out.

SUMMARY OF THE INVENTION

This invention relates to small movie projectors and, more particularly, to a novel and improved automatic film rewinding device therefor which is simple in construction, reliable in performance and easy to operate, and which can be used with either a film having its trailing end firmly secured to a film supply real spindle, such as a film housed in a film cartridge, or with a film which does not have its trailing end firmly secured to a spindle, such as a film mounted on an open reel.

In accordance with the present invention, when the film rewind device is used with a film having its trailing end firmly secured to a film supply reel spindle, the device provides for automatic rewinding of the film and projection of pictures while the film is moving in the reverse direction, or to provide for rewinding the film during projection and before the movement of the film has come to an end. When the device is used with a film which is not firmly secured at its trailing end to a film supply reel spindle, the device provides for rewinding the film from the take-up reel to the supply reel.

An automatic film rewinding device for a small movie projector, embodying the invention, is characterized in that the operation of all of the mechanisms of the projector is controlled by a control cam group mounted on a common shaft. This arrangement is conducive to eliminating undesirable multiplicity of parts, and to obtaining a compact overall size in a movie projector. The invention device is effective to release the relevant parts of the projector from a projecting position as the trailing end portion of the film is tensioned.

In the copending application mentioned above, such a control cam group is provided, and a locking lever is associated with the control cam group to lock the group in the forward feed film position. The arrangement in the copending application includes a plurality of control levers each of which is associated with a respective cam, and while the locking lever is moved to the release position responsive to tensioning of the film, this is effected through the medium of a member interposed between means responsive to film tensioning and the locking lever.

In the present invention, the cam group locking lever is directly released from a locking position by the lever mechanism or means actuated by tensioning of the film. In addition, the number of control cams is reduced, and only certain of the control levers are directly operated by control cams, with other levers being operated in slaved relation to the cam operated levers. This makes it possible to effect positively automatic rewinding of the film, while simplifying the construction of the automatic film rewinding device, as compared with the somewhat similar automatic rewinding device of the mentioned copending application. Stated another way, the automatic film rewinding device of the present invention accomplishes the same end results as that of the mentioned copending application but involves fewer parts and a much simpler construction.

The automatic film rewinding device embodying the invention is convenient in that the direction in which the operation knob turns when the film is automatically rewound is the same as the direction in which the operation knob is turned by the operator when it is desired to move the film in the reverse direction for projecting pictures. Thereby, it is possible to effect automatic film rewinding and reverse film movement for projection with the operating knob being disposed in the same position.

An additional advantage of the invention device is the fact that it permits readily effecting single-frame projecting or stopping the movement of the film, or projection of pictures while moving the film in a reverse direction. This is because it is possible to bring the driving mechanism of the projector to a neutral or to a film reverse movement position while maintaining the control lever group in a projection position by a holding member. Furthermore, the invention device permits manual control of the film rewinding as well as automatic control thereof, thereby making it possible to use not only a film cartridge but also an open reel in a movie projector incorporating the invention device.

An object of the invention is to provide an improved, simplified and more reliable automatic film rewinding device for small movie projectors.

Another object of the invention is to provide such an automatic film rewinding device which incorporates fewer parts than hitherto required.

A further object of the invention is to provide such an automatic film rewinding device which may be used either to project film in the normal feed direction, to project film in the reverse feed direction, or to effect single-frame projection.

Another object of the invention is to provide such an automatic film rewinding device which is usable with either a film cartridge or with film on an open reel.

A further object of the invention is to provide such an automatic film rewinding device which is selectively operable to effect rewinding of the film under manual control.

For an understanding of the principles of the invention, reference is made to the following description of a typical embodiment thereof as illustrated in the accompanying drawing.

DESCRIPTION OF A PREFERRED EMBODIMENT

Figure 1:
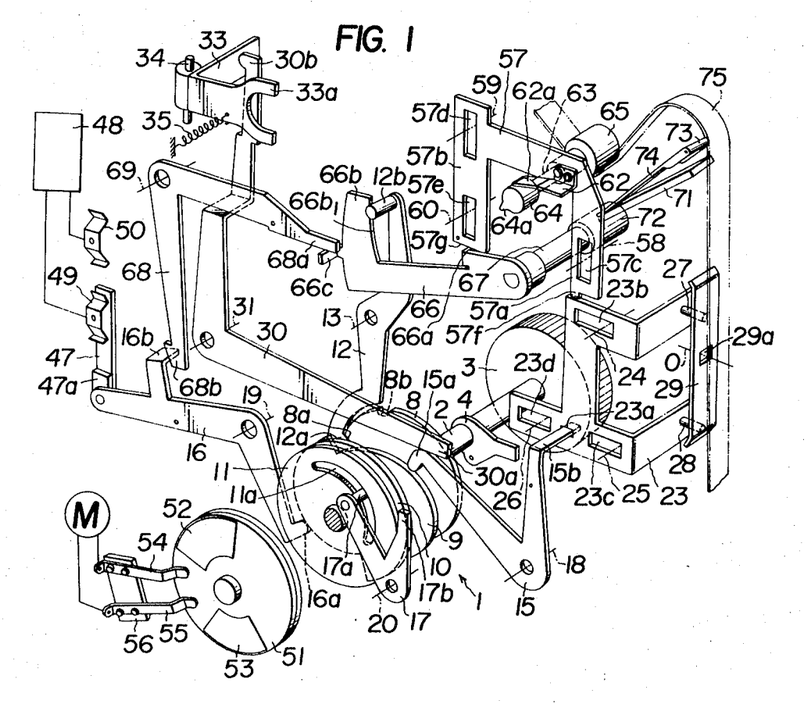
FIG. 1 is an exploded persective view of one form of automatic film rewinding device, for a small movie projector, embodying the invention, the parts being shown in the neutral position.
Figure 5:
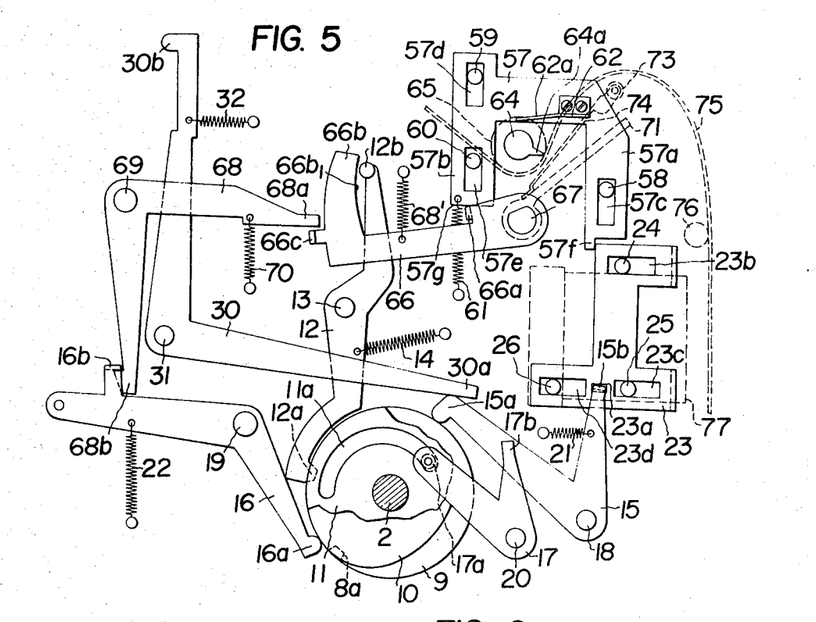
FIG. 5 is a side elevation view of the device with the parts in the film normal movement position for projecting pictures.

Referring to FIG. 1, the optical axis of a projection lens is illustrated at 0, the projection lens not being shown in FIG. 1 but being indicated at 77 in FIG. 5. The projection lens is disposed on the left side of the film pressing plate 29, and a lamp housing (not shown) is disposed opposite the projection lens with respect to plate 29. A shaft 2 is rotatably supported by the projector housing (not shown) and has a control cam group secured to its inner end portion and an operating knob 3 secured to its outer end. Knob 3 is disposed on the same side surface of the projector housing as that on which the projection lens is mounted.

Figure 2:
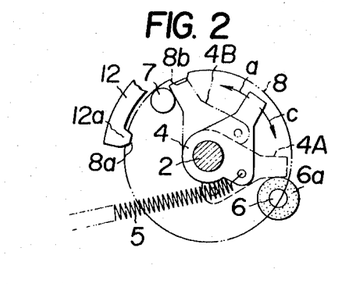
FIG. 2 is a side elevation view illustrating locking means for a control cam group for the automatic film rewinding device shown in FIG. 1.

A rotation limiter 4 is secured to an intermediate portion of shaft 2, and has a spring 5 connected thereto, as shown in FIG. 2, so as to urge shaft 2 to rotate clockwise as viewed in FIG. 2. The range of rotation of limiter 4 is restricted by a stop 6 (FIG. 2) covered with rubber or other resilient material 6a on its outer peripheral surface. Limiter 4 is adapted to be brought to a dash-and-dot line position 4A when it abuts against stop 6 which is mounted on the inner surface of a side wall of the projector housing. Another stop 7 is provided on the inner surface of the side wall, and positioned in spaced relation to stop 6 forwardly thereof in the path of movement of limiter 4, and limiter 4 is adapted to abut stop 7 as operating knob 3 is manipulated, from the exterior of the projector housing, to rotate shaft 2 against the bias of spring 5, the stop 7 thus limiting the angular movement of limiter 4 in this direction.

The control camp group 1 comprises a disc 8 and cams 9, 10 and 11, and disc 8 has its outer peripheral surface formed with peripherally spaced cutouts or notches 8a and 8b, as best seen in FIG. 2. When limiter 4 abuts stop 7 and is brought to a dash-and-dot line position 4B when operating knob 3 is manipulated to rotate shaft 2 against the bias of spring 5, disc 8 is click stopped in a position corresponding to the position 4B of limiter 4 as cutout 8a is engaged by an engaging portion or nose 12a of a cam group locking lever 12 adapted to press against the outer periphery of disc 8. When limiter 4 is brought to the solid line position in FIG. 2, which is substantially midway between stops 6 and 7, cutout 8b is engaged by nose 12a, thereby click stopping disc 8 in a position corresponding to the solid line position of limiter 4.

Lever 12 is pivotally supported by a shaft 13 and biased to pivot counterclockwise by a spring 14, as shown in FIG. 5. The click stopping of disc 8 exerts an influence on operating knob 3. Thus, if knob 3 is turned to rotate shaft 2 against the bias of spring 5, knob 3 also is click stopped in positions corresponding to the abovementioned positions of limiter 4. When limiter 4 is brought to the position 4B, shown in FIG. 2, as operating knob 3 is turned, it is possible to feed the film in the normal direction for projection of pictures, as subsequently to be described. When limiter 4 is brought to the position 4A, it is possible to rewind the film automatically or to move the film in the reverse direction for projection of pictures, also subsequently to be described. Finally, when limiter 4 is brought to a neutral position intermediate positions 4B and 4A, all the mechanisms of the projector are rendered inoperative. The normal film movement, reverse film movement and neutral positions can be indicated by suitable means on knob 3 and the outer surface of a side wall of the projector, so as to facilitate manipulation of knob 3.

Referring again to FIG. 1, levers 15 and 16 cooperate with cams 9 and 10, respectively, of cam group 1. Cam 11 is formed with a cam slot 11a which loosely receives a pin 17a secured to the end of one arm of a lever 17. Levers 15, 16 and 17 are pivotally supported by respective shafts 18, 19 and 20 which are mounted on the inner surface of a side wall of the projector housing.

Respective springs 21 and 22 are connected to levers 15 and 16 to bias these levers to press against the associated cams 9 and 10.

Figure 4A:
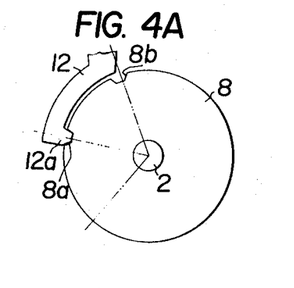
FIGS. 4A, 4B and 4C are somewhat schematic elevation views illustrating the relative positions of the cams of the control camp group and the associated control levers.
Figure 4B:
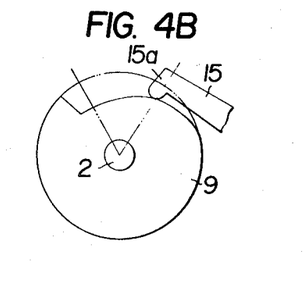
Figure 4C:
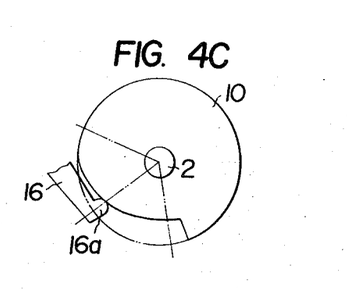

As previously mentioned, knob 3 is disposed in its neutral position in FIG. 1 and, under these conditions, engaging member of nose 12a of locking lever 12 is engaged in cutout 8a of disc 8 as shown in FIG. 4A, and cams 9 and 10, with their associated levers 15 and 16, are disposed in the relative positions shown in FIGS. 4B and 4C, respectively.

An end portion or nose 15a of one arm of lever 15 presses against an intermediate radius portion of cam 9, as shown in FIG. 4B, in the neutral position, and a bent end portion 15b of the other arm of lever 15 extends through an opening 23a formed in a pressing plate support 23. Support 23 is formed with slots 23b, 23c and 23d loosely receiving respective pins 24, 25 and 26 secured to a side wall of the projector housing. These pins support plate support 23 for sliding motion parallel to optical axis O. Upper and lower horizontal arms of support 23 are bent at right angles and loosely receive respective pins 27 and 28 in openings formed near the ends of these arms. Pressing plate 29 is firmly secured to pins 27 and 28, and is adapted to move to a retracted position, in which it is disposed in spaced relation to the path of travel of the film, when lever 15 is brought into engagement with a minor radius portion of cam 9.

An end portion 30a of one arm of a lever 30 abuts against the upper edge of the end portion of one arm of lever 15. Lever 30 is pivotally supported by a shaft 31 and biased by a spring 32 (FIG. 5) to press against lever 15. An end portion 30b of the other arm of lever 30 abuts against one arm of a clutch shifter 33 pivotally supported by a vertical shaft 34 and biased by a spring 35 to pivot clockwise about shaft 34, as viewed from above in FIG. 1. The end portion of the other arm of shifter 33 is bifurcated, as a 33a, and engages in a peripheral groove of a cylindrical portion or hub 37a of a clutch ring 37 (FIG. 3) of a film reverse movement mechanism mounted on a film supply reel spindle (not shown) and straddles this hub.

Figure 3:
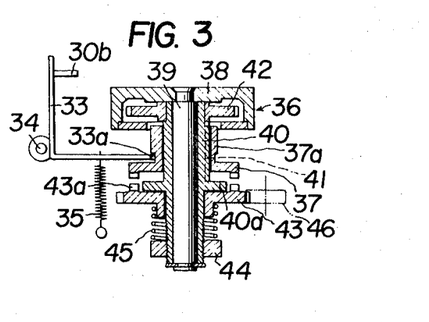
FIG. 3 is a fragmentary sectional view illustrating mechanism for moving the film supply reel spindle in the reverse or rewind direction.

Referring to FIG. 3, a shaft 39 is secured to a wall 38 of a support arm 36 for a film supply reel spindle, and a sleeve 40 is loosely telescoped over shaft 39. Sleeve 40 has a flange 40a and has mounted thereon clutch ring 37, which is connected to rotate therewith through the medium of a key 41 which is in a position nearer to the base end thereof than to the flange 40a. Clutch ring 37 is slidable axially of sleeve 40 but rotates therewith as a unit.

A gear 42 is secured to the base end portion of sleeve 40 and is connected to the film supply reel spindle through a gear train (not shown) provided in the support arm 36. A gear 43 is fitted loosely over sleeve 40 in a position forwardly of flange 40a, and a spring 45 embraces sleeve 40 between gear 43 and a stop ring 44 threaded on to the forward end portion of sleeve 40 and operable to bias gear 43 to press against flange 40a. As a result, gear 43 and flange 40a are frictionally connected with each other.

Gear 43 is connected to a motor M (FIG. 1) through the medium of a gear 46 which is brought into meshing engagement with gear 43, by suitable means, only when the film is to be moved in the reverse direction. Gear 43 is formed with a clutch portion 43a arranged to engage clutch ring 37. In the position of the parts shown in FIG. 3, clutch ring 37 is moved away from gear 43 by shifter 33, as lever 30 (FIG. 1) presses against end portion 15a of one arm of lever 15 then pressing against a major radius portion of cam 9, so that lever 30 presses shifter 33 against the bias of spring 35.

An end portion or nose 16a of one arm of lever 16 presses against an intermediate radius portion of cam 10, as shown in FIG. 4C, when lever 16 is in the position shown in FIG. 1, so that a switch contact 47, mounted on an end portion of the outer end of lever 16 through the medium of an insulator 47a, is brought to a lower position. A fixed contact 49 of a power source switch for a projection lamp 48 is in engagement with contact 47, and the other fixed contact of the power source switch is disposed above contact 49. When lever 16 moves switch contact 47 into the upper position, fixed contacts 49 and 50 are interconnected through contact 47 to complete an energizing circuit for lamp 48.

Cam slot 11a of cam 11 is adapted to pivot lever 17 through the medium of pin 17a when knob 3 is turned between the film normal movement, neutral and film reverse movement positions. A lever mechanism (not shown), for switching motor M between a normal direction of rotation and a reverse direction of rotation, is connected to an end portion 17b of the other arm of lever 17. Motor M operates in a manner such that, when knob 3 is brought to a film normal movement position, it rotates the film take-up reel spindle (not shown) in the normal direction, when knob 3 is brought to a neutral position, motor M does not rotate the film take-up reel spindle and, when knob 3 is brought to a film reverse movement position, it rotates gear 46 (FIG. 3) in a reverse direction. In the position of the parts shown in FIG. 1, knob 3 is in the neutral position so that motor M is de-energized, or is also in the "-neutral" position.

Referring to FIG. 1, an electrically non-conducting or dielectric disc 51, having two segmental conducting plates 52 and 53 secured to one surface thereof, is firmly secured to the inner end portion of shaft 2. Contacts 54 and 55, for supplying energizing current to motor M and which are supported by a support 56, press against the end surface of disc 51 carrying plates 52 and 53. In FIG. 1, contacts 54 and 55 are illustrated in contact with the dielectric disc 51, so that no current is supplied to motor M. When knob 3 is brought to a film normal movement position or to a film reverse movement position, one or the other of the conducting plates 52 or 53 is brought into engagement with contacts 54 and 55, to interconnect these contacts for flow of current through motor M to start the motor.

In the position of the parts shown in FIG. 1, a right leg 57a of a holding member 57 presses against a left shoulder of pressing plate support 23. Member 57 has a left leg 57b in addition to right leg 57a. Slots 57c, 57d and 57e formed in these two legs loosely receive respective pins 58, 59 and 60 to mount holding member 57 for vertical sliding movement. A spring 61 (FIG. 5) biases holding member 57 downwardly. A holding portion 57f is formed in the right leg 57a of member 57, and is adapted to engage and hold the left shoulder of support 23 for pressing plate 29. In FIG. 1, holding portion 57f is illustrated as disposed on the upper left edge of support 23.

A locking pawl 62 is secured to the shoulder of member 57, and has a forward or free end 62a which is positioned against an engaging pawl 64 secured to the inner end of a rotary shaft 63 mounted on a side wall of the projector housing. A rubber roller 65 is secured on an outwardly extending portion of shaft 63, and offers resistance to the movement of film in the film feed section when the film is fed, so as to aid in forming a film loop.

A bent portion 66a of a horizontal arm of an arm member 66 is positioned against the lower end edge 57g of leg 57b of member 57. Arm member 66 is secured at the end of its horizontal portion to the inner end of a shaft 67 which is rotatably supported by a side wall of the projector housing. A spring 68', which is slightly weaker than spring 61 connected to holding member 57, is connected to arm member 66 to bias member 66 to pivot clockwise about shaft 67, as viewed in FIG. 5.

The free end of arm member 66 is formed with an upright portion 66b which is formed, along its inner edge, as a cam edge 66b1 which is increasingly further from the center of shaft 67 proceeding from its lower end toward its free end. A pin 12b secured to an end portion of the other arm of cam group locking lever 12 engages cam edge 66b1 and, in FIG. 1, is illustrated as engaging this cam edge near its upper end. A bent ear 66c extends from the outer side edge of portion 66b of member 66, and is disposed beneath one arm 68a of a lamp turn-off lever 68 pivotally supported by a shaft 69 and biased by a spring 70 (FIG. 5), which is slightly weaker than spring 68' connected to arm member 66, to pivot clockwise, as viewed in FIG. 5, about shaft 69. Lever 68 is shown in FIG. 1 as having its end portion 68a of one arm being positioned above and against ear 66c of member 66, and an engaging portion 68b at the end portion of the other arm is shown, in FIG. 1, as engaging a bent portion or ear 16b of lever 16.

A sleeve 72 is secured to the outer end portion of shaft 67 supporting member 66, and has secured thereto an arm 71 which mounts, at its base portion, a base end portion of a resilient plate 74 rotatably supporting a roller 73 at its free end.

Figure 6:
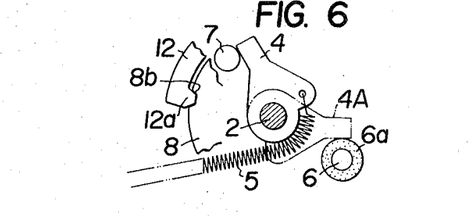
FIG. 6 is a fragmentary side elevation view of the device illustrating how the control cam group is locked when the device is in a film normal movement position for projecting pictures.

The operation of the device embodying he invention, as described above, will now be explained with reference first to its operation during movement of the film in a normal direction for projecting pictures onto a screen. If operating knob 3 is turned counterclockwise, as viewed in FIG. 1, then limiter 4 is rotated counterclockwise, or in the direction of the arrow a of FIG. 2, into the position 4B where it abuts stop 7. Disc 8 is locked by engagement of nose 12a in cutout 8b, as shown in FIG. 6, so that knob 3 is latched in its operative position. As a result of the operation of knob 3, cam group 1 is rotated to the film normal movement position, thereby bringing the control lever group to an operative position.

More specifically, levers 15 and 16 ride on the major radius portion of the respective cams 9 and 10, and lever 17 moves in slaved relation to cam 11, so as to put motor M in the film normal movement condition. Segmental conducting plate 52 rotates with disc 51 to interconnect contacts 54 and 55 to energize motor M. At this time, lever 30 moves, in slaved relation to lever 15, counterclockwise, as viewed in FIG. 1, about shaft 31, and is then held in a position pressing against lever 33.

Thus, clutch ring 37 (FIG. 3) is moved away from clutch portion 43a of gear 43. Also, gear 46 is disengaged from gear 43.

In moving from the minor radius portion to the major radius portion of cam 9, lever 15 pivots clockwise, as viewed in FIG. 1, about shaft 18, and pushes support 23, for film pressing plate 29, to the right, thereby moving pressing plate 29 into the path of travel of the film. The parts occupy the position held in FIG. 5. As support 23 slides to the right, holding member 57 moves downwardly until its holding portion 57f engages and holds the left upper shoulder of support 23, as shown in FIG. 5.

Upon the start of rotation of Motor M, a film 75 is fed from the supply reel in the film cartridge (not shown) through a guide (not shown) to the film supply section, where the film rubs against the underside of rubber roller 65 as it passes beneath this roller, so as to form a loop. Thereafter, the film is fed over guide roller 76 (FIG. 5) to the rear surface of film pressing plate 29. Rubber roller 65, for offering resistance to film movement, rotates in slaved relation to the film with which it is in rubbing contact, and forward end 64a of pawl 64 intermittently rubs against the underside of locking pawl 62, so that rotation of roller 65 is suitably controlled. Thereby, a resistance suitable to the formation of a film loop is provided by roller 65 on film 75. Pressing plate 29 is formed with an aperture 29a where the film 75 is intermittently advanced by film pull-down claws (not shown).

When lever 16 moves from the minor radius portion to the major radius portion of cam 10, it pivots clockwise about shaft 19 and pushes switch contact 47 upwardly to interconnect contacts 49 and 50 for closing the energizing circuit for light source 48. Bent portion 16b of lever 16 is engaged by portion 68b of lever 68, and held in this position by lever 68, as seen in FIG. 5. Film 75, moving intermittently past aperture 29a, has its frames projected by light source 48, a shutter (not shown) and projection lens 77, in cooperation with each other. The film is moved by the film pull-down claws, and is successively wound on the film take-up reel (not shown) which is driven by motor M in the normal direction.

Figure 7:
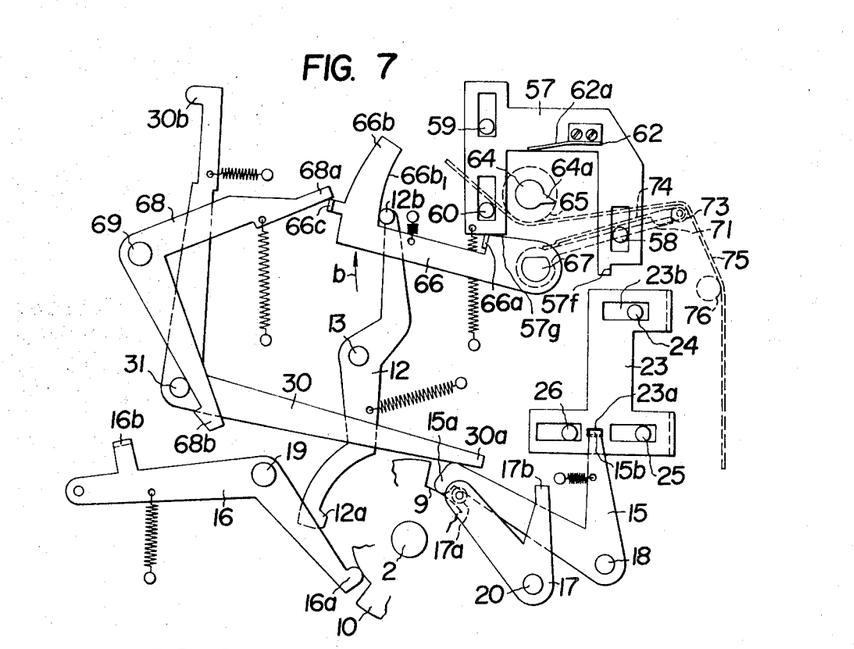
FIG. 7 is a view, similar to FIG. 5, but illustrating the device with the parts in the film rewinding position.

The operation of automatically reversing the movement of the film, for rewinding the film, will now be described. The trailing end of film 75 is firmly secured to the film supply reel spindle in the cartridge (not shown), so that as projection of the film frames progresses and nearly all of film 75 has been paid out, the film portion near its trailing end is tensioned in the film feed section and presses roller 73 and arm 71 downwardly with a large force, as shown in FIG. 7. This causes arm 71 to pivot clockwise from the position shown in FIG. 5, which causes arm member 66 to pivot in the same direction, or in the direction of the arrow b of FIG. 7, until it moves to the solid line position of FIG. 7. As arm member 66 moves in the direction of arrow b, its bent end portion 66a pushes holding member 57 upwardly, and its cam edge 66b1 and bent ear 66c move lever 12 and lever 68, respectively.

Figure 8:
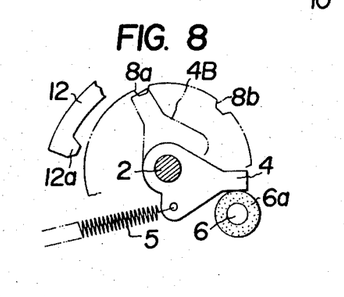
FIG. 8 is a view, similar to FIG. 6, but illustrating how the control cam group is locked when the device is in a film rewinding position.

Lever 12, pushed by cam edge 66b1, pivots clockwise about shaft 13, thereby releasing its engaging portion 12a from engagement with cutout 8b in disc 8. When released from this engagement, disk 8 with shaft 2 and cam group 1 is free to rotate in a clockwise direction, as viewed in FIG. 8, until limiter 4 abuts stop 6. This is due to the fact that shaft 2 is normally biased by spring 5 through limiter 4 to rotate clockwise. Resilient sleeve 6a on stop 6 absorbs the shock which might otherwise be applied to limiter 4 when it abuts stop 6. The provision of roller 73 in side-by-side relation with arm 71 in the film feed section prevents damage which might be inflicted on film 75 without some means to alleviate the impact.

Upon such rotation of shaft 2, knob 3 and control cam group 1 rotate conjointly with shaft 2 to move automatically into the film reverse movement position. Lever 15 moves from the major radius portion to the minor radius portion of cam 9, and pivots counterclockwise, as viewed in FIG. 5, about shaft 18. At the same time, support 23 for pressing plate 29 has been released from locking engagement with holding portion 57f of member 57 because member 57 has been moved upwardly by arm member 66, so that support 23 is slid to the left, as viewed in FIG. 5, by end portion 15b of the arm of lever 15, to move pressing plate 29 away from the path of film movement.

As lever 15 is brought into engagement with the major radius portion of cam 9, lever 30 moves clockwise, in FIG. 5, about shaft 31 in slaved relation to lever 15, and into the position shown in FIG. 7. In this latter position of lever 30, its end portion 30b ceases to press against shifter 33, permitting shifter 33 to pivot clockwise about shaft 34 so that its bifurcated portion 33a moves clutch ring 37 into engagement with clutch portion 43a of gear 43 (FIG. 3).

Lamp turn-off lever 68, pushed by arm member 66, pivots counterclockwise about shaft 69, from the position shown in FIG. 5 and releases its locking engagement with lever 16. Since lever 16 is adjacent the minor radius portion of cam 10 at this time, it pivots counterclockwise about shaft 19 to press against cam 10. This pivoting of lever 16 moves switch contact 47 downwardly, thereby disconnecting contacts 49 and 50 from each other and de-energizing light source lamp 48.

With cam 11 being now disposed in the film reverse movement position, lever 17 and motor M are brought to the film reverse movement position also. At this time, gear 46 is meshed with gear 43 (FIG. 3) so that the film take-up reel (not shown) is disconnected from the driving mechanism. When cam shaft 2 has rotated into the film reverse movement position, conducting plate 52 on disc 51 disengages contacts 54 and 55 and conducting plate 53 engages these contacts so that motor M continuously rotates. With motor M rotating in the film reverse movement position, its rotation is transmitted through gear 46 to gear 43, and through clutch ring 37, sleeve 40 and gear 52, to the film supply reel (not shown). As a result, the film supply reel is rotated in the reverse direction and film 75 is rewound smoothly thereon.

Figure 9:
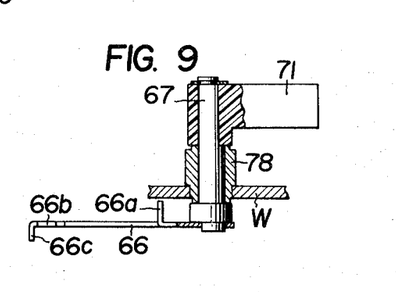
FIG. 9 is a plan view, partly in axial section, of the lever mechanism operated in accordance with tension in the film, and illustrating its construction.

As best seen in FIG. 9, a tubular sleeve 78, secured to a side wall W of the projector housing, receives shaft 57 to which is secured the arm adapted to be pressed by the tensioned film 75. A liquid of high viscosity, such as silicone oil, fills the gap between sleeve 78 and shaft 67, so as to interfere with and delay rotation of shaft 67.

When the various mechanisms of the projector are brought to the film reverse movement position, they are maintained therein without pressing engagement of film 75 with arm 71. At this time, holding member 57 gradually moves downwardly until it abuts against the upper edge of support 23. The position in which member 57 abuts against support 23 in the film reverse movement position is higher than the position in which it abuts against support 23 in the film normal movement position, by a distance corresponding to the height of holding portion 57f of member 57. This prevents locking pawl 62 from coming into locking engagement with engaging pawl 64. Rubber roller 65, brought into engagement with film 75, is rotated thereby while maintaining contact therewith, so as to offer a minimum resistance to the movement of film 75 during smooth rewinding of the film. If knob 3 is turned to its neutral position when the rewinding of the film is completed, all of the mechanisms of the projector are restored to the neutral position shown in FIG. 1, with motor M being cut off from its source of power and thus ceasing to rotate.

The operations of stopping film movement for effecting single-frame projection, and moving the film in the reverse direction for projecting pictures onto the screen, will now be explained. As mentioned, FIG. 5 shows the projector mechanisms in a normal film movement position for projecting pictures onto the screen. Single-frame projection can be effected by stopping movement of the film during the time the film is moving in the normal direction for projection, by turning knob 3 into its neutral position. If knob 3 is moved to the position shown in FIG. 1, the nose 12a of lever 12 engages cutout 8a on the periphery of disc 8, thereby bringing the levers of the control lever group into engagement with the intermediate radius portions of the respective cams, as shown in FIGS. 2, 4A, 4B and 4C.

With the control cam group and control lever group in this position, support 23 for pressing plate 29 is engaged and locked, at its left upper shoulder, by holding portion 57f of member 57, as seen in FIG. 5, so that film pressing plate 29 is maintained in the path of film movement. Since lever 15 is held in a position in which it presses against support 23 for plate 29, lever 30 is maintained in a position in which it presses against shifter 33. Thus clutch ring 37 is maintained out of engagement with gear 43. Lever 16 is held by lever 68, so that switch contact 47 interconnects contacts 49 and 50 of light source lamp 48 to keep lamp 48 lit.

On the other hand, turning knob 3 to its neutral position results in lever 17 being brought to its neutral position by cam slot 11a of cam 11, thereby bringing motor M to its neutral or de-energized position. When this is the case, gear 46, for film reverse movement operation, is maintained out of engagement with gear 43, and disc 51 is brought to its neutral position in which contacts 54 and 55 of motor M are disconnected from both conducting plates 52 and 53 so that no more current is supplied to motor M which is de-energized. Thus, film 75 stops moving and remains stationary, so that the frame of film 75 juxtaposed to aperture 29a is projected onto the screen.

The film can be moved in the reverse direction, for projecting pictures onto the screen, if operating knob 3, in its neutral or single-frame projection position, is turned in the direction of arrow c of FIG. 2 into its film reverse movement position. Turning of knob 3 into its film reverse movement position rotates control cam group 1 into its reverse film movement position, but the other mechanisms of the projector are maintained in the single-frame projection position, with only lever 17 being moved by cam slot 11a of cam 11 into its film reverse movement position. Thus, motor M is brought to its film reverse movement condition and, at this time, gear 46 is engaged with gear 43. Disc 51 is rotated with shaft 2 as knob 3 is turned, so that plate 53 interconnects contacts 54 and 55 of motor M, thereby energizing the motor. The rotation of motor M is transmitted through gear 45 to gear 43, which rotates sleeve 40 by virtue of its frictional connection with flange 40a. The rotation of sleeve 40 is transmitted through gear 42 and the gear train (not shown) to the film supply reel spindle (not shown) to rotate the latter in the reverse direction. At this time, the film take-up reel (not shown) is disconnected from the driving mechanism.

Rotation of the film supply reel in reverse direction causes film 75 to move past aperture 29a in the reverse direction, so that pictures are projected while the film is moving in the reverse direction. At this time, rubber roller 65 is rotated clockwise by film 75, but ceases to rotate as the forward end 42a of pawl 42 is engaged by the forward end 62a of pawl 62 in its locking position.

The automatic film rewind device embodying the invention functions satisfactorily when the projector uses a film firmly secured at its trailing end to the firm supply reel spindle, such as a film housed in a film cartridge. However, when the film used is not firmly secured at its trailing end to the film supply reel spindle, such as a film wound on an open reel, all the film will be wound on the take-up reel because the end portion of the film is not tensioned and arm 71 is not pressed by the film. In such case, the present invention permits rewinding the film from one reel to the other by connecting the end of the film, wound on the take-up reel, directly to the supply reel. More specifically, when film 75 is all wound on the take-up reel, knob 3 is moved to its neutral position and, as a result, motor M is de-energized. If, at this time, the end of the film wound on the take-up reel is manually connected to the supply reel, and the arm 71 is moved downwardly by some suitable means to move operating knob 3 to its film reverse movement position, the film supply reel is rotated in the reverse direction in the same manner as in the aforementioned automatic film rewinding operation, so that the film is rewound on the supply reel. Rewinding of the film can be stopped by moving knob 3 to its neutral position again. It should be noted that, if arm 71 is operated while the film is moved in the normal direction for projecting pictures onto the screen, it is possible to rewind the film during projection of pictures.

In the illustrated and described embodiment of the invention, rubber roller 65 has been described as being provided in the film supply section for offering resistance to film movement. It is to be understood that the invention is not limited to this specific form of resistance means, and that a sprocket wheel, connected by suitable clutch means to the motor, may be used in place of the rubber roller. When such sprocket wheel is used, suitable means, such as lever 30 provided for operating shifter 33 for shifting clutch ring 37 of the mechanism for rotating the film supply reel spindle in the reverse direction (FIG. 3), is used for controlling the clutch means.

While a specific embodiment of the invention has shown and described in detail to illustrate the application of the principles of the invention, it will be understood that the invention may be embodied otherwise without departing from such principles.

What is claimed is:

1. An automatic film rewinding device for small movie projectors of the type having a film supply section, a projection lamp and components, including a driving motor, for driving the film in a forward film feed direction and a reverse film rewinding direction, said device comprising, in combination, a control cam group; externally accessible operating means operable to move said control cam group between forward film feed, neutral and reverse film feed positions; resilient means biasing said control cam group to its reverse film feed position; a cam group locking lever operatively associated with said control cam group and operable to releasably lock said control cam group in either said forward film feed position or said neutral position; a control lever group operatively associated with said control cam group and said components and operable in slaved relation by said control cam group, when the latter is moved to its forward film feed position, to set said components to feed a film forwardly; a lever mechanism operatively associated with said locking lever and engaged by a film secured at its trailing end to the shaft of a film supply reel, said lever mechanism, responsive to tensioning of the film in the film supply section in the terminating stage of film supply, directly moving said locking lever to release its locking of said control lever group for movement of said control cam group, by said resilient means, to its reverse film feed position to move said control lever group to set said components to feed the film in a reverse rewind direction to effect automatic rewinding of the film; and a holding member operable to hold and lock said control lever group in the forward film feed position; said lever mechanism, responsive to tensioning of the film in the film supply section in the terminating stage of film supply, directly moving said holding member to release its locking of said control lever group; said lever mechanism comprising a rotatably mounted shaft and a release lever secured at one end to said shaft to rotate therewith, said release lever having a cam surface, adjacent is free end, engageable with an end of said locking lever and having a projection at its free end engageable with said holding member; said shaft being rotated, responsive to such tensioning of the film, to swing said release lever in a direction effecting movement of said locking lever to the cam group release position and to effect movement of said holding member in a direction to release its locking of said control lever group; said cam surface being a curved cam surface extending in the direction of movement of said release lever but eccentric to said shaft; said locking lever being pivoted intermediate its ends and carrying a roller engageable with said cam surface.

2. An automatic film rewinding device for small movie projectors of the type having a film supply section, a projection lamp and components, including a driving motor, for driving the film in a forward film direction and a reverse film rewinding direction, said device comprising, in combination, a control cam group; externally accessible operating means operable to move said control cam group between forward film feed, neutral and reverse film feed positions; resilient means biasing said control cam group to its reverse film feed position; a cam group locking lever operatively associated with said control cam group and operable to releasably lock said control cam group in either said forward film feed position or said neutral position; a control lever group operatively associated with said control cam group and said components and operable in slaved relation by said control cam group, when the latter is moved to its forward film feed position, to set said components to feed a film forwardly; a lever mechanism operatively associated with said locking lever and engaged by a film secured at its trailing end to the shaft of a film supply reel, said lever mechanism, responsive to tensioning of the film in the film supply section in the terminating state of the film supply, directly moving said locking lever to release its locking of said control lever group for movement of said control cam group, by said resilient means, to its reverse film feed position to move said control lever group to set said components to feed the film in a reverse rewind direction to effect automatic rewinding of the film; a holding member operable to hold and lock said control lever group in the forward film feed position; said lever mechanism, responsive to tensioning of the film in the film supply section in the terminating stage of film supply, directly moving said holding member to release its locking of said control lever group; a rotatable shaft having said cam group secured thereto adjacent one end thereof; said operating means including an operating knob secured to the other end of said rotatable shaft and externally accessible; said components of the projector including a clutch and a clutch operating lever; said cam group consisting of three axially adjacent cams each engaged by a respective first control lever; and second control lever pivoted intermediate its ends and having a first arm engageable with said clutch operating lever and a second arm engageable with one of said first control levers and movable in slaved relation with the latter.

3. An automatic film rewind device, as claimed in claim 2, including a pair of spaced fixed contacts controlling an energizing circuit for said driving motor; and a circuit closure means secured to rotate with said shaft and operable, upon movement of said control knob in either direction from its neutral position, to interconnect said fixed contacts to complete the energizing circuit for said driving motor.

4. An automatic film rewind device, as claimed in claim 2, in which said control lever group includes a pivoted power source lever; a pair of fixed spaced contacts controlling an energizing circuit for said projection lamp; and a circuit closer on said power source lever operable, upon movement of said control knob to the forward film position, to interconnect said contacts to energize said projection lamp.

5. An automatic film rewind device, as claimed in claim 2, including a film pressing plate; and a horizontally movable support member for said film pressing plate; said control lever group including a pressing plate operating lever engaged with said support member and operable, responsive to movement of said control knob to the forward film feed position, to move said support member to position said pressing plate in the path of film movement; said holding member holding and locking said support member in its operated position.

6. An automatic film rewind device, as claimed in claim 2, including a rotation limiting member secured to said shaft; said resilient means comprising a tension spring having an end secured to said rotation limiting member; a first fixed stop engageable by said rotation limiting member upon movement of said control knob to the forward film position; and a second fixed stop engageable with said rotation limiting member upon operation of said release means; said second fixed stop carrying resilient sleeve means engageable with said rotation limiting member.

7. An automatic film rewind device, as claimed in claim 2, in which said control cam group includes a disc cam formed with a cam slot; and a normal-reverse direction switching lever having a pin engaged in said cam slot; said switching lever controlling said driving motor to operate in either the forward film feed direction or the reverse film feed direction.

8. An automatic film rewinding device for small movie projectors, as claimed in claim 2, including a disc secured to said shaft to rotate therewith and having a pair of circumferentially spaced notches in its periphery; said locking lever being pivoted intermediate its ends and having a nose engageable in said notches; said nose engaging in one notch in the forward film feed position of said control cam group and engaging in the other notch in the neutral position of said control cam group.

* * * * *